(12) United States Patent
Villarreal

(10) Patent No.: US 10,899,208 B2
(45) Date of Patent: Jan. 26, 2021

(54) MOTORIZED WINDSHIELD SUNSHADE

(71) Applicant: Michael Villarreal, San Antonio, TX (US)

(72) Inventor: Michael Villarreal, San Antonio, TX (US)

( * ) Notice: Subject to any disclaimer, the term of this patent is extended or adjusted under 35 U.S.C. 154(b) by 89 days.

(21) Appl. No.: 16/271,204

(22) Filed: Feb. 8, 2019

(65) Prior Publication Data

US 2020/0254861 A1 Aug. 13, 2020

(51) Int. Cl.
*B60J 11/02* (2006.01)
*B60J 11/08* (2006.01)

(52) U.S. Cl.
CPC .............. *B60J 11/025* (2013.01); *B60J 11/08* (2013.01)

(58) Field of Classification Search
CPC ................................. B60J 11/025; B60J 11/08
See application file for complete search history.

(56) References Cited

U.S. PATENT DOCUMENTS

| | | | | |
|---|---|---|---|---|
| 2,270,978 A * | 1/1942 | Swormstedt | .............. | E06B 9/58 160/267.1 |
| 3,116,097 A * | 12/1963 | Novales | .................. | E06B 9/581 312/297 |
| 5,172,744 A * | 12/1992 | Finch | ........................ | E06B 9/15 160/133 |
| 5,762,393 A * | 6/1998 | Darmas, Sr. | ........... | B60J 11/025 296/136.01 |
| 6,206,451 B1 * | 3/2001 | Maano | ...................... | B60J 11/00 296/136.04 |
| 6,227,601 B1 * | 5/2001 | LaFrance | ............... | B60J 1/2011 296/97.11 |
| 6,513,858 B1 * | 2/2003 | Li | ........................... | B60J 11/02 150/166 |
| 7,128,125 B2 * | 10/2006 | Harbison | .................. | E06B 9/42 160/273.1 |
| 8,016,014 B2 * | 9/2011 | Crider | ....................... | E06B 7/16 160/201 |
| 9,623,740 B1 * | 4/2017 | Tran | ........................ | B60J 11/02 |
| 10,639,976 B2 * | 5/2020 | Pepe | ....................... | B60R 13/02 |
| 2003/0070775 A1 * | 4/2003 | Li | ........................... | B60J 11/00 160/370.22 |
| 2005/0035619 A1 * | 2/2005 | Verhelst | ................. | B60P 3/343 296/26.01 |

(Continued)

FOREIGN PATENT DOCUMENTS

FR 2948900 A1 * 2/2011 ............ B60J 7/0015

*Primary Examiner* — Lori L Lyjak
(74) *Attorney, Agent, or Firm* — The Iwashko Law Firm, PLLC; Lev Ivan Gabriel Iwashko

(57) ABSTRACT

A motorized sunshade to optionally cover at least a portion of a windshield of an automobile, the motorized sunshade including a roller rod removably disposed on a top edge of an exterior surface of the windshield, a rolling shade disposed within an interior portion of the roller rod to cover the windshield in response to a movement of the rolling shade from a first position to a second position and to expose the windshield in response to a movement of the rolling shade from the second position to the first position, and a plurality of tracks disposed at side edges of the windshield and removably connected to the roller rod, such that the rolling shade slides between and at least partially within each of the plurality of tracks.

10 Claims, 2 Drawing Sheets

(56) References Cited

U.S. PATENT DOCUMENTS

| | | | |
|---|---|---|---|
| 2006/0145517 A1* | 7/2006 | Sadornill | B60J 7/0015 |
| | | | 296/214 |
| 2006/0202501 A1* | 9/2006 | Tadakamalla | B60J 1/2052 |
| | | | 296/97.8 |
| 2006/0272214 A1* | 12/2006 | Simonelli | E06B 7/086 |
| | | | 49/92.1 |
| 2007/0210606 A1* | 9/2007 | Alacqua | B60J 3/0204 |
| | | | 296/97.8 |
| 2008/0035283 A1* | 2/2008 | Miyachi | B60J 1/2027 |
| | | | 160/370.21 |
| 2009/0038766 A1* | 2/2009 | Smith, Jr. | B60J 11/06 |
| | | | 160/370.21 |
| 2009/0072575 A1* | 3/2009 | Browne | B60J 11/025 |
| | | | 296/97.7 |
| 2010/0013262 A1* | 1/2010 | Shu | B60J 1/2038 |
| | | | 296/97.8 |
| 2012/0007385 A1* | 1/2012 | Ramesh | B60J 11/06 |
| | | | 296/136.04 |
| 2014/0336935 A1* | 11/2014 | Zhu | G01S 17/86 |
| | | | 702/3 |
| 2016/0236552 A1* | 8/2016 | Hannan | B60P 7/04 |
| 2017/0225549 A1* | 8/2017 | Kanai | B60J 1/2041 |
| 2017/0341494 A1* | 11/2017 | Hannan | B60J 7/068 |

\* cited by examiner

MOTORIZED WINDSHIELD SUNSHADE

BACKGROUND

1. Field

The present general inventive concept relates generally to a sunshade, and particularly, to a motorized windshield sunshade.

2. Description of the Related Art

During the summer months, the Sun can easily heat up an interior of a vehicle (i.e., automobile), particularly when a driver and/or a passenger leave the vehicle. Under these conditions, the vehicle dashboards and upholstery become hot and can injure the driver and/or the passenger upon returning to the vehicle, if the hot interior is touched.

There are limited products available on the market that prevent such harsh heat and the Sun's ultraviolet (UV) rays from ruining the interior of the vehicle while keeping the vehicle cool at the same time.

Therefore, there is a need for a windshield shade that can protect the interior of the vehicle, maintain a cool temperature within the vehicle even when the Sun is shining brightly, and prevent a person entering the vehicle from injury due to high temperatures.

SUMMARY

The present general inventive concept provides a motorized windshield sunshade.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a motorized sunshade to optionally cover at least a portion of a windshield of an automobile, the motorized sunshade including a roller rod removably disposed on a top edge of an exterior surface of the windshield, a rolling shade disposed within an interior portion of the roller rod to cover the windshield in response to a movement of the rolling shade from a first position to a second position and to expose the windshield in response to a movement of the rolling shade from the second position to the first position, and a plurality of tracks disposed at side edges of the windshield and removably connected to the roller rod, such that the rolling shade slides between and at least partially within each of the plurality of tracks.

The roller rod may include a communication unit disposed within the roller rod to receive commands from at least one external device.

The at least one external device may include a control unit disposed within an interior portion of the vehicle to send commands to the communication unit to manipulate the rolling shade based on an input of a user.

The rolling shade may move to any position on the windshield in response to the input.

The rolling shade may change opaqueness in response to the input.

The at least one external device may include a mobile device to communicate with the communication unit to manipulate the rolling shade based on an input of a user, and to allow the user to manipulate the rolling shade from areas outside the automobile.

The roller rod may include a motor disposed within an interior portion of the roller rod, such that the rolling shade moves in at least one of the first direction and the second direction in response to a rotation of the motor.

The roller rod may include a sensor to detect at least one of a temperature outside the automobile and a UV radiation level outside the automobile.

The motorized sunshade may further include a processor to compare the at least one of the temperature outside the automobile and the UV radiation level outside the automobile with at least one of a predetermined temperature level and a predetermined UV radiation level, respectively, and to automatically control the motor to move the rolling shade based on the comparison.

The rolling shade may be retracted within the roller rod in the first position, and the rolling shade may be at least partially extracted from the roller rod in the second position.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Various example embodiments (a.k.a., exemplary embodiments) will now be described more fully with reference to the accompanying drawings in which some example embodiments are illustrated. In the FIGURES, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

The motorized windshield sunshade 100 may be removably affixed and/or adhered to an outer surface of the windshield 11, using an adhesive such as a tape, a glue, and/or a magnet, but is not limited thereto.

Figure 2:
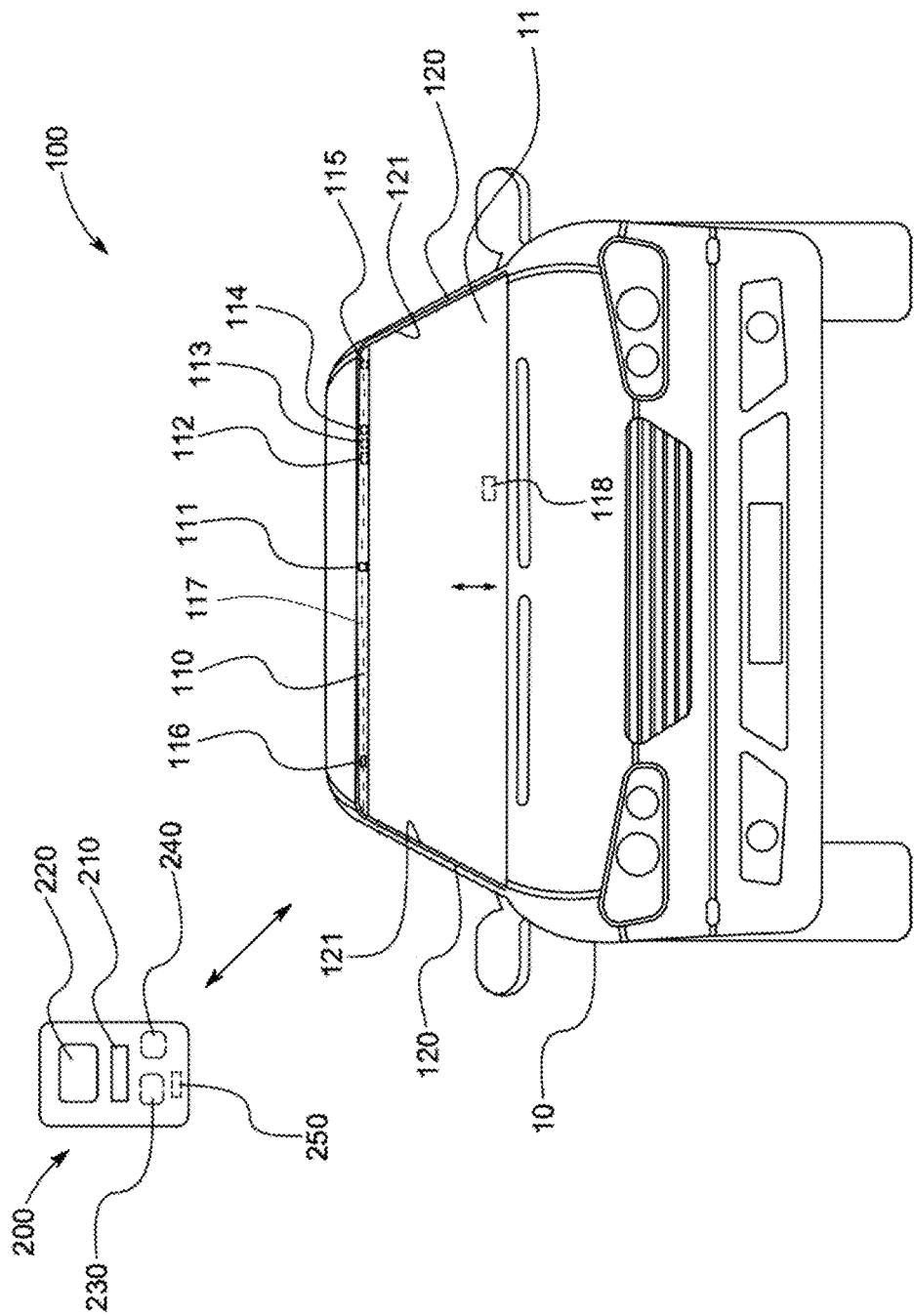
FIG. 2 illustrates a front perspective view of the motorized windshield sunshade disposed on the vehicle including the rolling shade in the first position, according to an exemplary embodiment of the present general inventive concept.

FIG. 2 illustrates a front perspective view of the motorized windshield sunshade disposed on the vehicle including the rolling shade in the first position, according to an exemplary embodiment of the present general inventive concept.

The motorized windshield sunshade 100 may be constructed from at least one of metal, plastic, wood, glass, and rubber, etc., but is not limited thereto.

The motorized windshield sunshade 100 may include a roller rod 110 and a plurality of tracks 120, but is not limited thereto.

The motorized windshield sunshade 100 may be constructed of a predetermined size to fit a windshield 11 of the vehicle 10.

The motorized windshield sunshade 100 may be removably affixed and/or adhered to an outer surface of the windshield 11, using an adhesive such as a tape, a glue, and/or a magnet, but is not limited thereto.

The roller rod 110 may include a sensor 111, a processor 112, a storage unit 113, a communication unit 114, a motor 115, a battery 116, a rolling shade 117, and a control unit 118, but is not limited thereto.

The sensor 111 may include at least one of a heat sensor and a light sensor, but is not limited thereto.

The processor 112 (or central processing unit, CPU) may include electronic circuitry to carry out instructions of a computer program by performing basic arithmetic, logical, control and input/output (I/O) operations specified by the instructions. The processor 112 may include an arithmetic logic unit (ALU) that performs arithmetic and logic operations, processor registers that supply operands to the ALU and store the results of ALU operations, and a control unit that fetches instructions from memory and "executes" them by directing the coordinated operations of the ALU, registers and other components. The processor 112 may also include a microprocessor and a microcontroller.

The storage unit 113 may include a random access memory (RAM), a read-only memory (ROM), a hard disk, a flash drive, a database connected to the Internet, cloud-based storage, Internet-based storage, or any other type of storage unit.

The communication unit 114 may include a device capable of wireless or wired communication between other wireless or wired devices via at least one of Wi-Fi, Wi-Fi Direct, infrared (IR) wireless communication, satellite communication, broadcast radio communication, Microwave radio communication, Bluetooth, Bluetooth Low Energy (BLE), Zigbee, near field communication (NFC), and radio frequency (RF) communication, USB, Firewire, and Ethernet.

The rolling shade 117 may be constructed of a flexible material, such as polyester, cloth, sheet metal, etc., but is not limited thereto.

Figure 1:
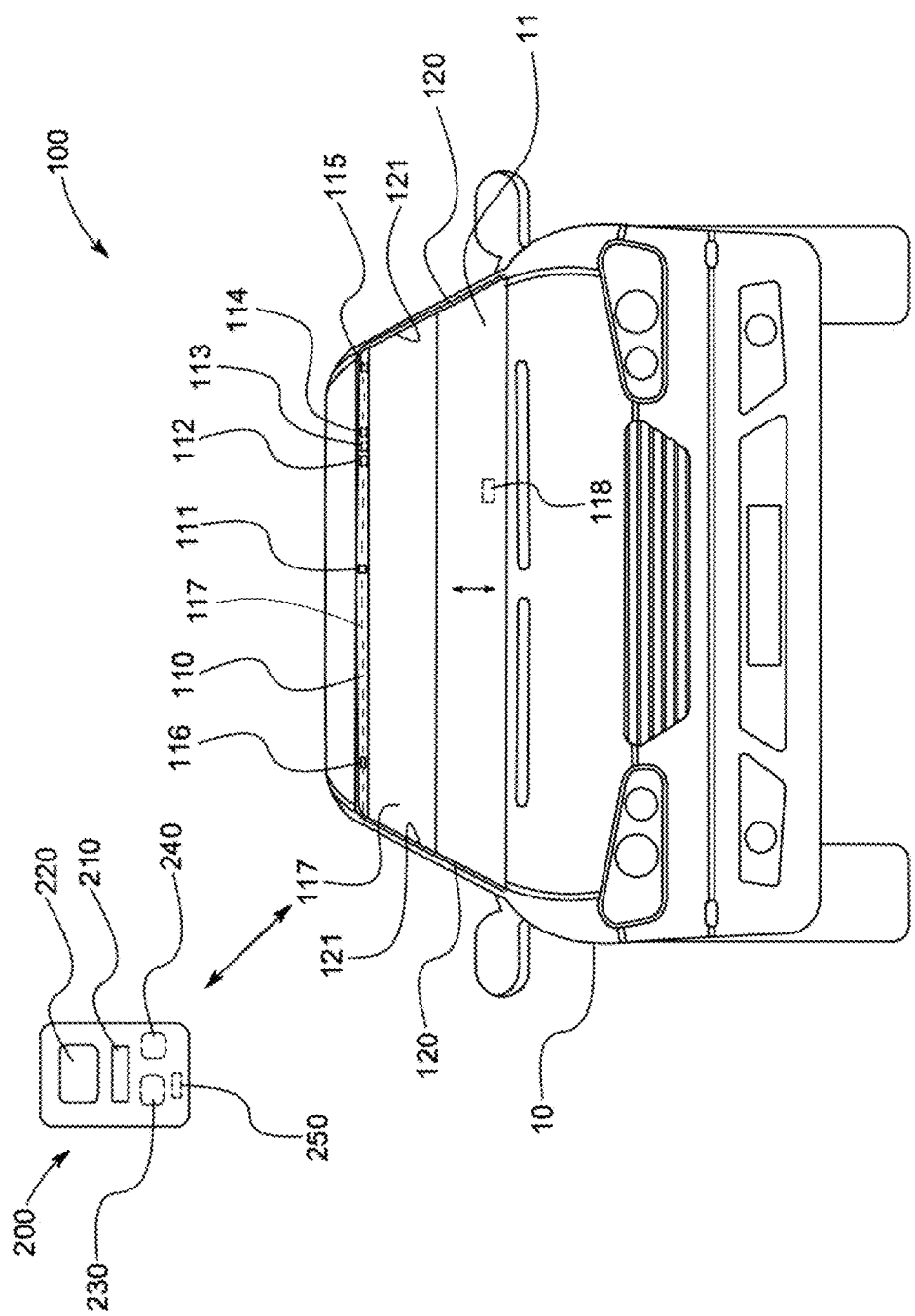
FIG. 1 illustrates a front perspective view of a motorized windshield sunshade disposed on a vehicle including a rolling shade moving from a first position to a second position, according to an exemplary embodiment of the present general inventive concept.

The roller rod 110 may be removably disposed on a top edge of an exterior surface of the windshield 11 of the vehicle 10. The rolling shade 117 may be disposed within an interior portion of the roller rod 110. The motor 115 may be disposed within an interior portion of the roller rod 110. The sensor 111 may detect when a temperature outside the vehicle 10 has reached at least a predetermined temperature level stored in the storage unit 113. Additionally, the sensor 111 may send a signal to the processor 112 that the temperature outside the vehicle 10 has reached at least the predetermined temperature level, such that the motor 115 responds. As such, referring to FIGS. 1 and 2, the processor 112 may send a command to the motor 115 to at least partially extend the rolling shade 117 from a first position (i.e. retracted) in a first direction or a second direction to a second position (i.e. extracted), such that the rolling shade 117 covers at least a portion of the windshield 11 of the vehicle 10. In other words, the rolling shade 117 moves in at least one of the first direction and the second direction in response to automatic control of the motor 115 by the processor 112 based on results of the processor 112 comparing the temperature outside the vehicle 10 to the predetermined temperature level. As such, the rolling shade 117 may prevent an interior of the vehicle 10 from reaching hotter temperatures than the predetermined temperature level. Therefore, the user may touch at least a portion of the interior of the vehicle 10 without injury due to a hot surface.

The sensor 111 may detect when the temperature outside of the vehicle 10 has reached at least a temperature less than the predetermined temperature level stored in the storage unit 113. The sensor 111 may send a signal to the processor 112 that the temperature outside the vehicle 10 has reached a level less than the predetermined temperature, such that the motor 115 responds. As such, the processor 112 may send a command to the motor 115 to retract the rolling shade 117 from the second position in the second direction to the first position, such that the rolling shade 117 is stored in the roller rod 110.

In other words, the rolling shade 117 covers the windshield 11 of the vehicle 10 in response to a movement of the rolling shade 117 from the first position to the second position and exposes the windshield 11 of the vehicle 10, such that the rolling shade 117 retracts into the roller rod 110 in response to a movement of the rolling shade 117 from the second position to the first position.

Alternatively, the sensor 111 may detect when a UV radiation level from a light source (e.g., the Sun) outside the vehicle 10 has reached at least a predetermined UV radiation level stored in the storage unit 113. Additionally, the sensor 111 may send a signal to the processor 112 that the UV radiation level outside the vehicle 10 has reached at least the predetermined UV radiation level, such that the motor 115 responds. As such, the processor 112 may send a command to the motor 115 to extend the rolling shade 117 from the first position in the first direction to the second position, or the second direction from the second position to the first position, such that the rolling shade 117 covers at least a portion of the windshield 11 of the vehicle 10. In other words, the rolling shade 117 moves in at least one of the first direction and the second direction in response to automatic control of the motor 115 by the processor 112 based on results of the processor 112 comparing the UV radiation level outside the vehicle 10 to the predetermined UV radiation level. As such, the rolling shade 117 may prevent further UV radiation from reaching the interior of the vehicle 10 and causing damage thereto.

The sensor 111 may detect when the UV radiation level outside the vehicle 10 from the light source has decreased below the predetermined UV radiation level stored in the storage unit 113. The sensor 111 may send a signal to the processor 112 that the UV radiation level outside the vehicle 10 has decreased below the predetermined UV radiation level, such that the motor 115 responds. As such, the processor 112 may send a command to the motor 115 to retract the rolling shade 117 from the second position in the second direction to the first position, such that the rolling shade 117 is stored in the roller rod 110.

The battery 116 may include lithium-ion, nickel cadmium, nickel metal hydride, alkaline, etc., but is not limited thereto.

The roller rod 110 may receive power from the battery 116.

A control unit 118 may include a keyboard, a touchpad, a mouse, a trackball, a stylus, a voice recognition unit, a visual data reader, a camera, a wireless device reader, and a holographic input unit.

A user may manually operate the roller rod 110 using the control unit 118.

The control unit 118 may be disposed within at least an interior portion of the vehicle 10. Alternatively, the control unit 118 may be disposed within a dashboard on an interior portion of the vehicle 10 or the control unit 118 may be removably connected to any portion of an interior portion of the vehicle 10 and used from areas outside the vehicle 10. The user may operate the roller rod 110 using the control unit 118. Specifically, the processor 112 may perform operations in response to a manipulation of the control unit 118 according to a user's preferences. The user may enter an input on the control unit 118, such that the rolling shade 117 extends from the first position in the first direction to the second position, or the second direction from the second position to the first position, such that the rolling shade 117 covers at least a portion the windshield 11 of the vehicle 10 and/or any position therebetween. In other words, the user may manipulate the rolling shade 117 to any position on the windshield 11 of the vehicle 10 based on the user's preference in response to the input on the control unit 118.

Conversely, the user may manipulate the rolling shade 117 to retrace from the second position to the first position in the second direction, or extend from first position in the first direction to the second position, such that the rolling shade 117 is stored in the roller rod 110 in response to the input on the control unit 118.

The rolling shade 117 may include an organic light-emitting diode (OLED), but is not limited thereto.

Also, the user may change an opaqueness of the rolling shade 117 from a first setting (i.e. clear) to a second setting (i.e. black) and/or any variation therebetween in response to the input on the control unit 118. The opaqueness of the rolling shade 117 may be a cosmetic feature that does not impact the rolling shade 117 from preventing UV radiation from penetrating the windshield 11 of the vehicle 10.

The communication unit 114 may be disposed within at least an interior portion of the roller rod 110. The control unit 118 may wirelessly communicate with the communication unit 114. In other words, the communication unit 114 may receive commands from the control unit 118. The communication unit 114 may transmit any commands received from the control unit 118 to the processor 112.

A user may manually operate the roller rod 110 using at least one external device 200 from areas outside the vehicle 10. Alternatively, the control unit 118 may be interchangeably used in place of the at least one external device 200.

The at least one external device 200 may be a mobile phone, a laptop computer, a tablet computer, a desktop computer, a palm pilot, a smart watch, etc., but is not limited thereto, and may be any type of mobile device that connects to the Internet or any other type of network. In other words, the at least one external device 200 may also be referenced as an apparatus 200, for at least the reason that the at least one external device 200 may be movable or stationary, depending on the user's preference).

The at least one external device 200 may include an input unit 210, display unit 220, a processor 230, a communication unit 240, and a storage unit 250.

The input unit 210 may include a keyboard, a touchpad, a mouse, a trackball, a stylus, a voice recognition unit, a visual data reader, a camera, a wireless device reader, and a holographic input unit.

The display unit 220 may include a plasma screen, an LCD screen, a light emitting diode (LED) screen, an organic LED (OLED) screen, a computer monitor, a hologram output unit, a sound outputting unit, or any other type of device that visually or aurally displays data.

Also, the display unit 220 may be combined with the input unit 210 to be a touch-screen.

The processor 230 (or central processing unit, CPU) may include electronic circuitry to carry out instructions of a computer program by performing basic arithmetic, logical, control and input/output (I/O) operations specified by the instructions. The processor 230 may include an arithmetic logic unit (ALU) that performs arithmetic and logic operations, processor registers that supply operands to the ALU and store the results of ALU operations, and a control unit that fetches instructions from memory and "executes" them by directing the coordinated operations of the ALU, registers and other components. The processor 230 may also include a microprocessor and a microcontroller.

The communication unit 240 may include a device capable of wireless or wired communication between other wireless or wired devices via at least one of Wi-Fi, Wi-Fi Direct, infrared (IR) wireless communication, satellite communication, broadcast radio communication, Microwave radio communication, Bluetooth, Bluetooth Low Energy (BLE), Zigbee, near field communication (NFC), and radio frequency (RF) communication, USB, Firewire, and Ethernet.

The storage unit 250 may include a random access memory (RAM), a read-only memory (ROM), a hard disk, a flash drive, a database connected to the Internet, cloud-based storage, Internet-based storage, or any other type of storage unit.

The communication unit 240 of the at least one external device 200 may communicate with the communication unit 114 of the roller rod 110. As such, the user may manipulate the external device 200 via the input unit 210 by entering an input thereto, such that the rolling shade 117 extends from the first position to the second position in the first direction, or from the second position to the first position in the second direction, such that the rolling shade 117 covers at least a portion the windshield 11 of the vehicle 10 and/or any position therebetween. In other words, the external device 200 may manipulate the roller rod 110 in response to a communication with the processor 112 via the communication unit 114. The user may select the position of the rolling shade 117 as displayed on the display unit 220.

Conversely, the user may retract the rolling shade 117 from the second position to the first position in the second direction, or the first position to the second position in the first direction, such that the rolling shade 117 is stored in the roller rod 110 in response to an input on the input unit 210 of the at least one external device 200.

Also, the user may change the opaqueness of the rolling shade 117 from the first setting to the second setting and/or any variation therebetween in response to an input on the input unit 210 of the at least one external device 200. The opaqueness of the rolling shade 117 may be a cosmetic feature that does not impact the rolling shade 117 from preventing UV radiation from penetrating the windshield 11 of the vehicle 10. The user may select the opaqueness of the rolling shade 117 as displayed on the display unit 220.

Each of the plurality of tracks 120 may include a sliding clamp 121.

The plurality of tracks 120 may be removably affixed and/or adhered along each side of the windshield 11 of the vehicle 10, using an adhesive such as a tape, a glue, and/or a magnet, but is not limited thereto. Each of the plurality of tracks 120 may be disposed at side edges of the windshield 11 and may be removably connected to each end of the roller rod 110. The rolling shade 117 may be removably connected on each sliding clamp 121 of the plurality of tracks 120. Moreover, the sliding clamp 121 may move (i.e. slide) within each of the plurality of tracks 120 in response to the motor 115 extending the rolling shade 117.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A motorized sunshade to optionally cover at least a portion of a windshield of an automobile, the motorized sunshade comprising:
   a roller rod removably disposed on a top edge of an exterior surface of the windshield;
   a rolling shade disposed within an interior portion of the roller rod to cover the windshield in response to a movement of the rolling shade from a first position to a second position and to expose the windshield in response to a movement of the rolling shade from the second position to the first position; and
   a plurality of tracks disposed at side edges of the windshield and removably connected to the roller rod, such that the rolling shade slides between and at least partially within each of the plurality of tracks.

2. The motorized sunshade of claim 1, wherein the roller rod comprises:
   a communication unit disposed within the roller rod to receive commands from at least one external device.

3. The motorized sunshade of claim 2, wherein the at least one external device comprises:
   a control unit disposed within an interior portion of the vehicle to send commands to the communication unit to manipulate the rolling shade based on an input of a user.

4. The motorized sunshade of claim 3, wherein the rolling shade moves to any position on the windshield in response to the input.

5. The motorized sunshade of claim 3, wherein the rolling shade changes opaqueness in response to the input.

6. The motorized sunshade of claim 2, wherein the at least one external device comprises:
   a mobile device to communicate with the communication unit to manipulate the rolling shade based on an input of a user, and to allow the user to manipulate the rolling shade from areas outside the automobile.

7. The motorized sunshade of claim 1, wherein the roller rod comprises:
   a motor disposed within an interior portion of the roller rod, such that the rolling shade moves in at least one of the first direction and the second direction in response to a rotation of the motor.

8. The motorized sunshade of claim 7, wherein the roller rod comprises:
   a sensor to detect at least one of a temperature outside the automobile and a UV radiation level outside the automobile.

9. The motorized sunshade of claim 8, further comprising:
   a processor to compare the at least one of the temperature outside the automobile and the UV radiation level outside the automobile with at least one of another temperature level and a another UV radiation level, respectively, and to automatically control the motor to move the rolling shade based on the comparison.

10. The motorized sunshade of claim 1, wherein the rolling shade is retracted within the roller rod in the first position, and the rolling shade is at least partially extracted from the roller rod in the second position.

* * * * *